United States Patent [19]

Ohrberg et al.

[11] 4,355,670
[45] Oct. 26, 1982

[54] FORESTRY SITE PREPARATION SYSTEM

[75] Inventors: George E. Ohrberg, Bogalusa; James R. O'Dair, Alexandria, both of Calif.

[73] Assignee: Crown Zellerbach Corporation, San Francisco, Calif.

[21] Appl. No.: 959,967

[22] Filed: Nov. 13, 1978

Related U.S. Application Data

[63] Continuation-in-part of Ser. No. 853,054, Nov. 21, 1977, abandoned.

[51] Int. Cl.³ ............................................. A01G 23/08
[52] U.S. Cl. ................................. 144/34 R; 144/334; 144/337; 56/13.9; 56/119; 241/101.7
[58] Field of Search ................... 144/2 P, 2 N, 162 R, 144/172, 174, 34 R, 218, 230, 163; 241/101.7, 105, 152 A, 154; 56/13.6, 13.7, 13.8, 13.9, 16.6, 119, 159

[56] References Cited

U.S. PATENT DOCUMENTS

| | | | |
|---|---|---|---|
| 1,312,450 | 8/1919 | McKay et al. | 144/2 N |
| 3,871,427 | 3/1975 | Widegran et al. | 144/34 R |
| 3,979,075 | 9/1976 | Heron | 144/34 R |
| 4,109,690 | 8/1978 | Berg | 144/163 |
| 4,232,719 | 11/1980 | Payton | 144/34 R |
| 4,236,554 | 12/1980 | Nicholson | 144/309 AC |

*Primary Examiner*—W. D. Bray
*Attorney, Agent, or Firm*—Jerome S. Marger

[57] ABSTRACT

A forestry site preparation system is provided for removing woody material, including trees, stumps and slash from forest terrain. The system includes clearing means having a means attached thereto for fragmenting the woody material and directing the particulate masses produced by this fragmentation toward the clearing means. An auxiliary fragmenting means closely associated with the fragmenting means is also provided. By setting the distance between the fragmenting and auxiliary fragmenting means, respectively, particulate masses of a maximum, predetermined size can be produced. A tree-felling assembly extending outwardly from the housing to which the fragmenting means is mounted is employed in felling the standing trees by exerting a positive force on the tree, thereby causing felling to occur in a direction away from the system. If desired, the particulate masses can be collected and transferred to a remote storage area.

22 Claims, 18 Drawing Figures

DETAILED DESCRIPTION OF THE DRAWINGS

Figures 1, 2:
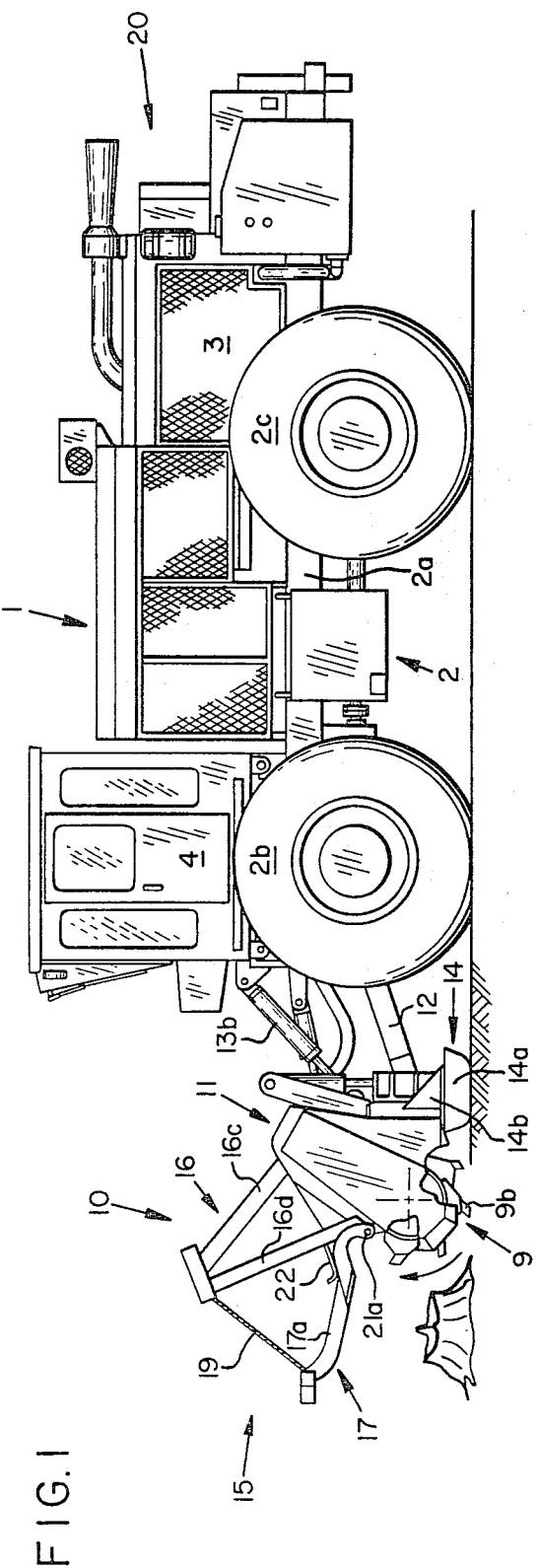
FIG. 1 is a side elevation view of a forestry site preparation system, in accordance with the present invention.
FIG. 2 is a plan view of the forestry site preparation system of FIG. 1.
Figure 6:
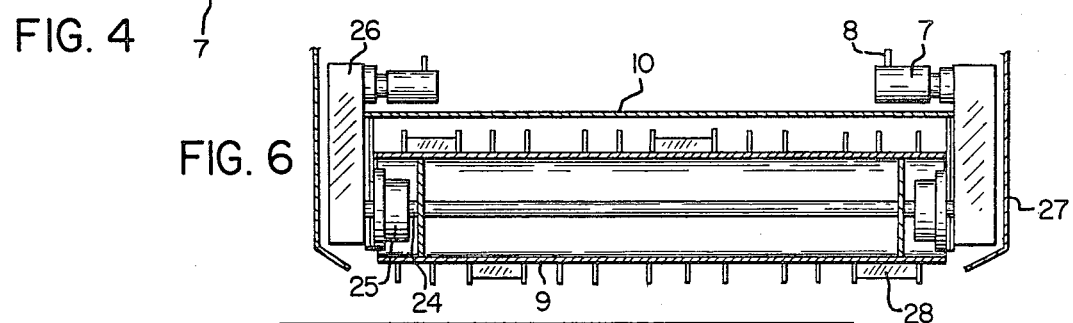
Figure 8:
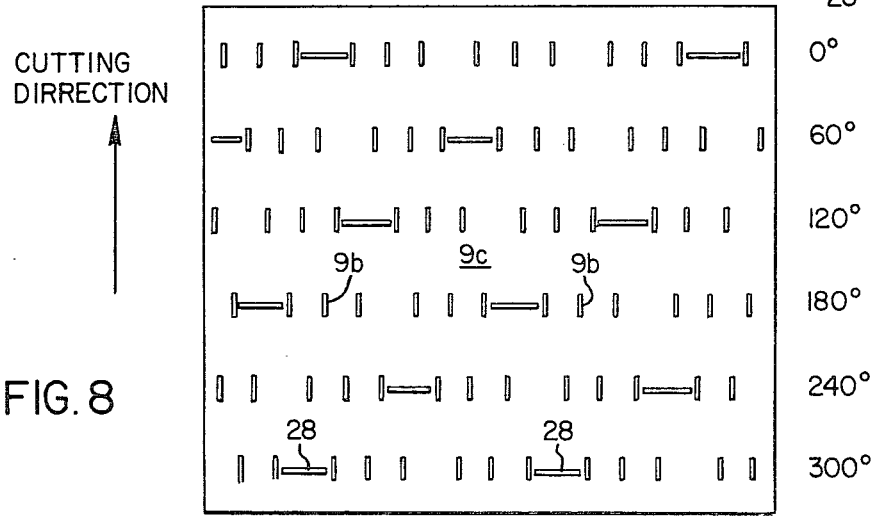
Figure 5:
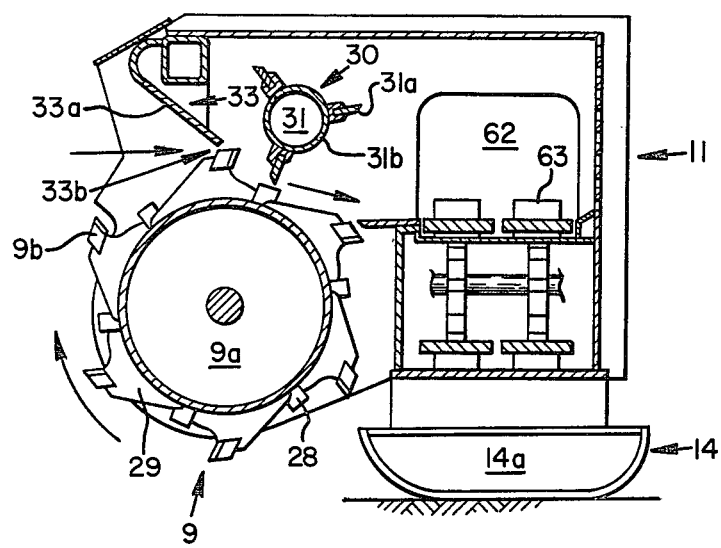
Figure 7:
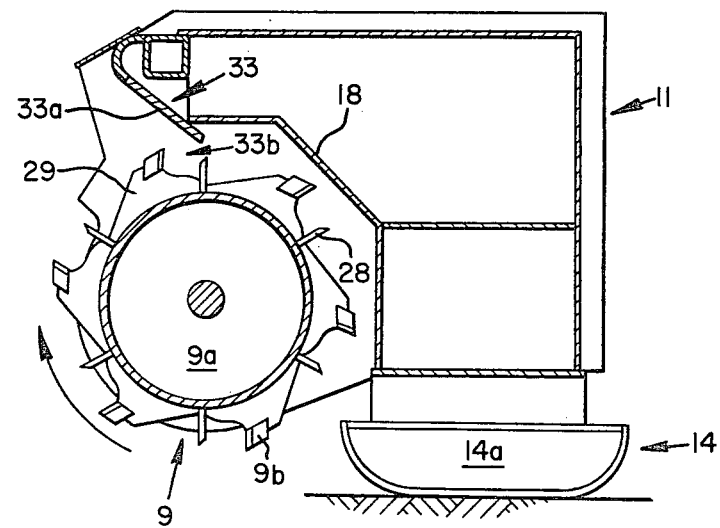
Figure 9:
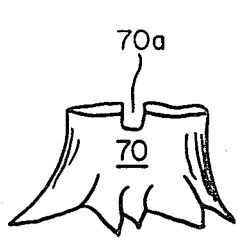
Figure 10:
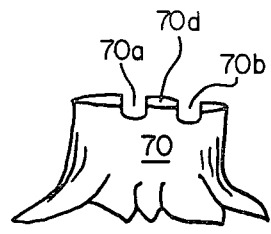
Figure 11:
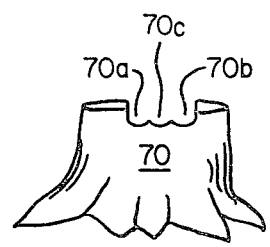
Figure 12:
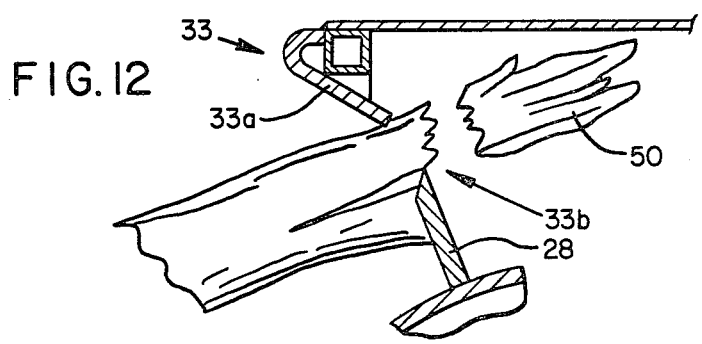
Figure 13:
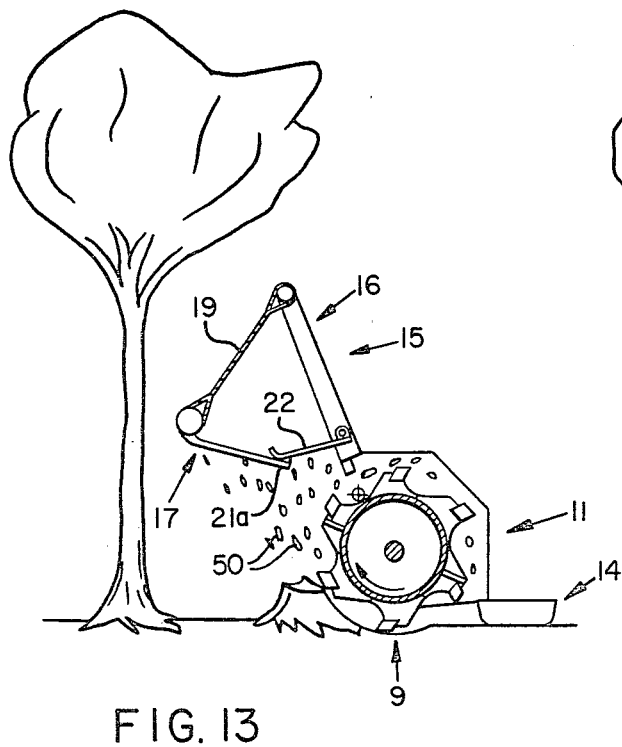
Figure 14:
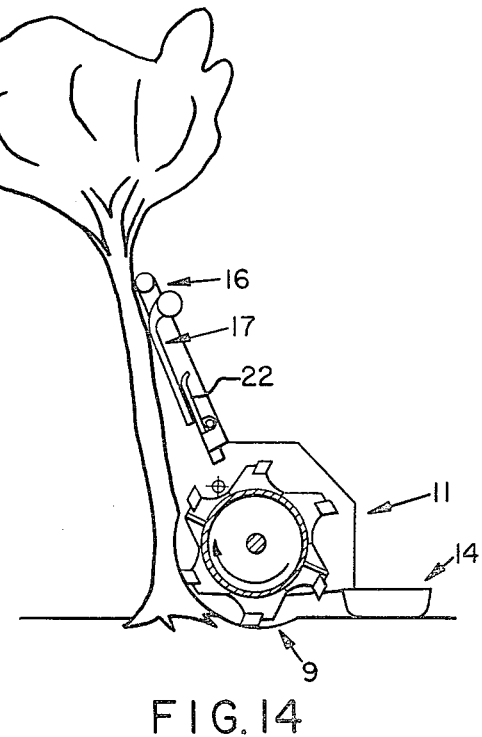
Figure 15:
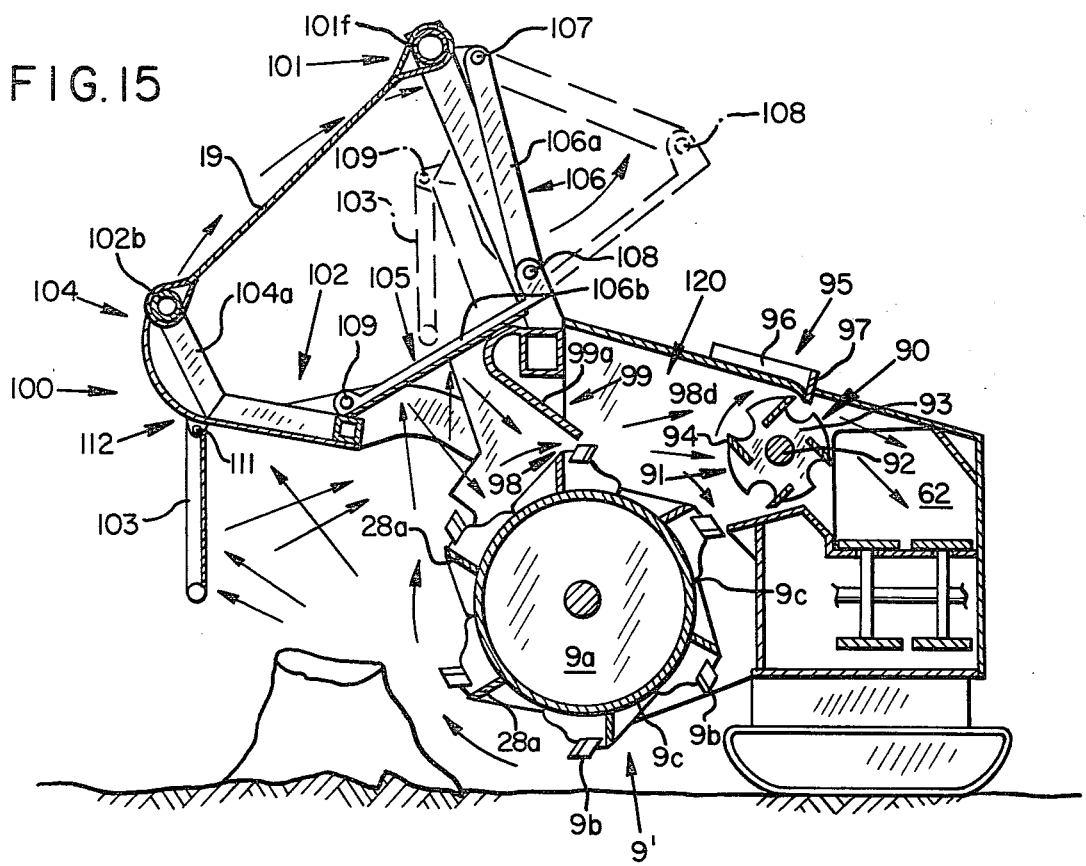
Figure 16:
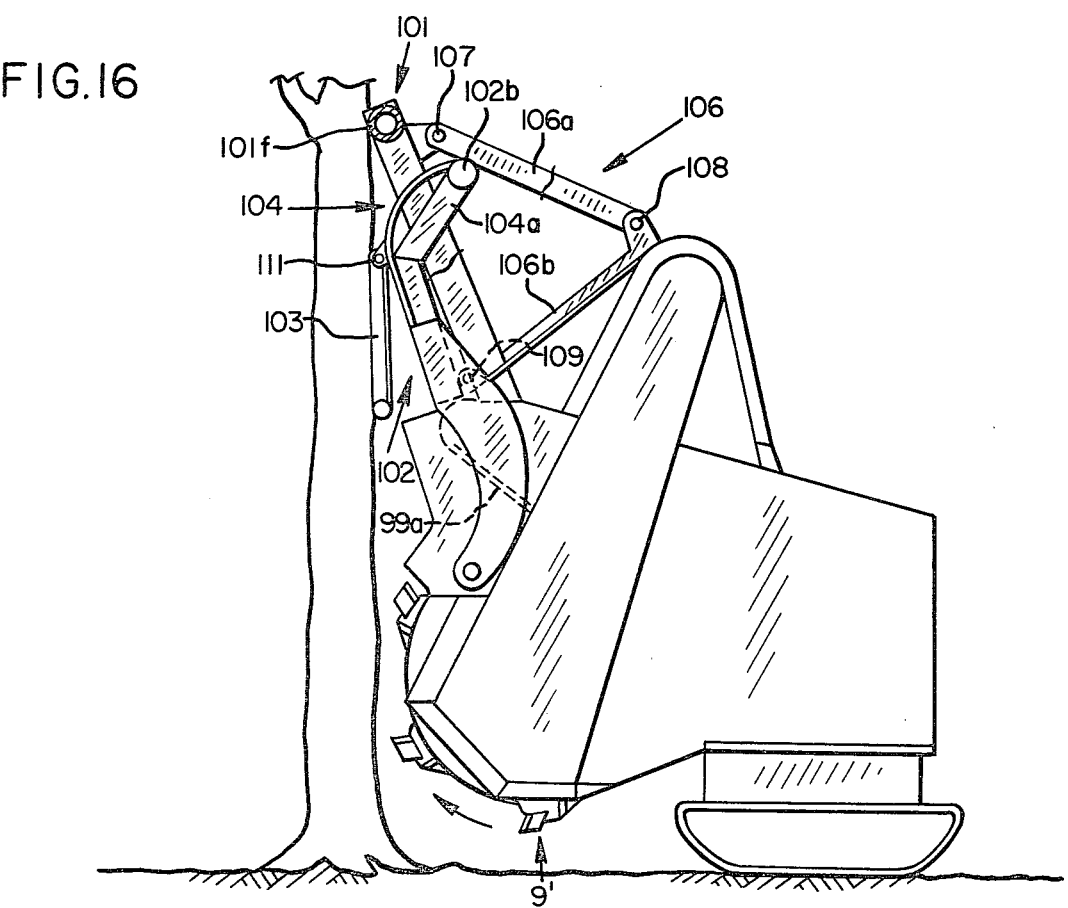
Figure 17:
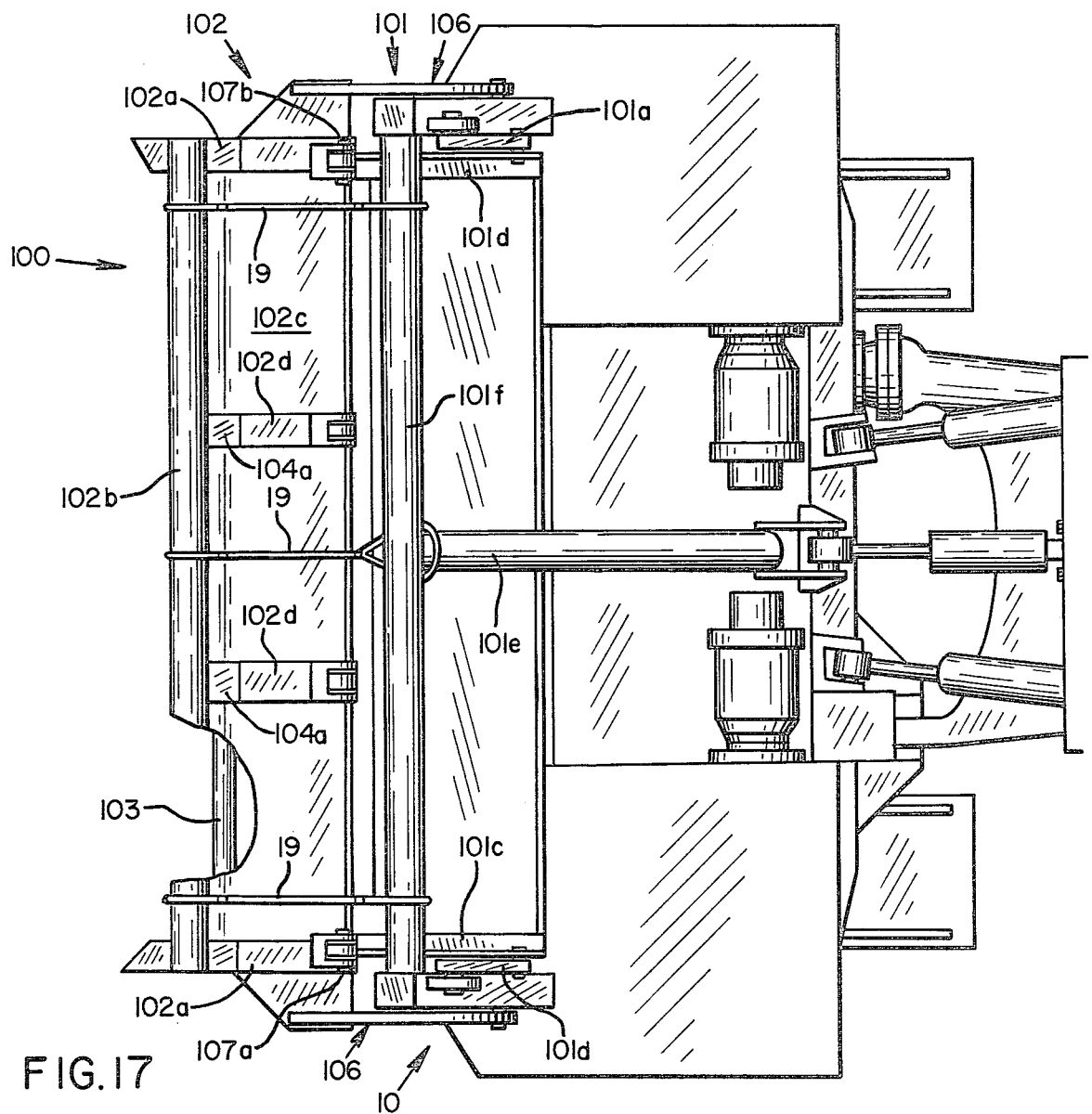
Figure 18:
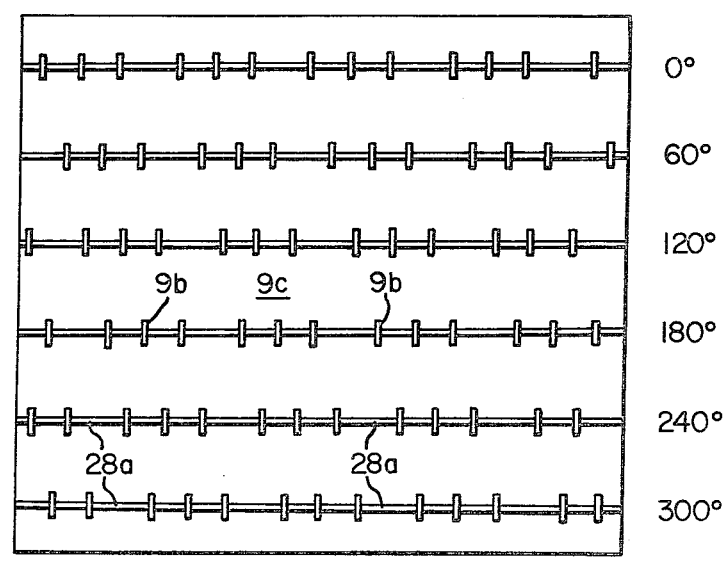

FIG. 5 is an enlarged, sectional view, taken along the line 5—5 in FIG. 2, showing the interior portion of clearing means 10, including a collecting means 60, and auxiliary fragmenting means 30;

FIG. 6 is an enlarged, detailed view showing the manner in which fragmenting means 9 is rotatably mounted to housing 11;

FIG. 7 is an enlarged, sectional view of a forestry site preparation system similar to the embodiment depicted in FIG. 5, excluding collecting means 60 and auxiliary fragmenting means 30, and including shield 18;

FIG. 8 is a diagrammatic plan view of a preferred arrangement of teeth 9b and breaker bars 28 on the peripheral surface 9c of horizontally disposed cylindrical drum 9a;

FIGS. 9-11 are side elevation views of a tree stump after the preferred cutting pattern imparted, in a stepwise manner, by fragmenting means 9;

FIG. 12 is an enlarged, detailed view of a tree being fragmented by breaker bar 28 coacting with anvil means 33a;

FIGS. 13 and 14 are illustrative representations of the workings of tree-felling assembly 15;

FIGS. 15 and 16 are enlarged, sectional views of a further embodiment having novel auxiliary fragmenting means wherein the deflector assembly is depicted in the respective extended and retracted positions;

FIG. 17 is a plan view of the embodiment of FIG. 15;

FIG. 18 is a diagrammatic plan view of FIG. 8, wherein breaker bars 28a extend across the entire periphery of drum 9a.

DETAILED DESCRIPTION OF THE INVENTION

Figure 3:
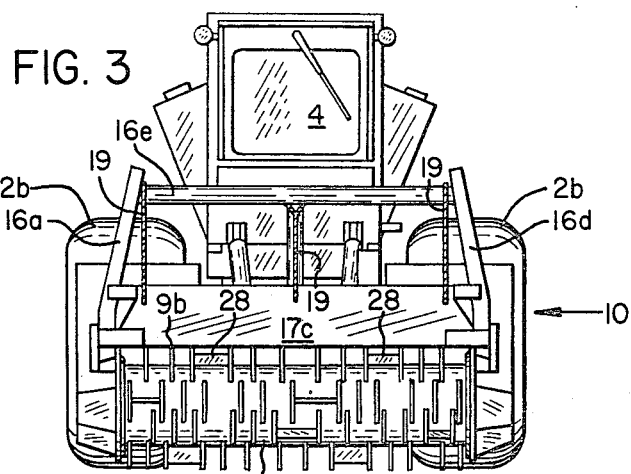
FIG. 3 is an end view of the forestry site preparation system of FIG. 1.

Referring now to FIG. 1, a site preparation system 20, adapted for use with any apparatus capable of transporting the system through woody terrain, is generally shown in which a transporting apparatus, denoted as "1", provides a means for year-around movement of the system through woody terrain. As specifically depicted in FIGS. 1-3, transporting apparatus 1 comprises a carrier assembly 2 having a carrier frame 2a and front and rear sets of wheels 2b and 2c, respectively. A diesel engine 3 is mounted on the carrier frame and provides the primary power plant for the system. A cab 4, which is enclosed for year-around use, is mounted forward on the carrier frame so that the operator can safely observe the areas which are to be cleared. The vehicle controls are contained in the cab for controling vehicle speed, steering, engine speed, and the positioning of hereinafter described clearing means 10.

Attached to the transporting apparatus 1, and adapted for use therewith, is a means for clearing the above described woody material from woody terrain, generally designated "10". Clearing means 10 includes means, denoted as "9", for fragmenting the woody material into particulate masses 50. Fragmenting means 9 also moves a substantial portion of these particulate masses toward clearing means 10. Fragmenting means 9 is preferably a horizontally disposed cylindrical drum 9a rotatably mounted to a frame-like housing 11. To impart the requisite degree of fragmenting of the woody material so that particulate masses are formed, a plurality of spaced teeth 9b are affixed to the peripheral surface 9c of cylindrical drum 9a. Housing 11 is attached to transporting means 1 via frame support arms 12. Means 13, attached at one end to clearing means 10 and, at the other end, to transporting means 1, is provided for vertical, lateral and axial adjustment of the clearing means with respect to the transporting means. Use of adjustment means 13 insures optimum positioning of fragmenting means 9. Preferably, a pair of hydraulic cylinders 13a and 13b are employed for this purpose.

Adjustable height skid 14, attached to the bottom of housing 11, is provided which permits fragmentation means 9 to be set at a plurality of positions with respect to the vertical axis of system 20. The adjustable height skid 14 depicted in FIGS. 1, 5 and 7 comprises a lower runner member 14a connected to an upper support block 14b, which, in turn, is joined to clearing means 10. By adjusting the vertical dimension of block 14b, through replacement or supplementation thereof, the vertical height of skid 14 can be adjusted. Adjustable means 13 can also preferably be set at a "float" position so that clearing means 10 is permitted to move freely without maintaining a predetermined fixed position. Thus, if the float position is employed, skid 14 will conform to and move along the changing contours of the terrain as the site preparation system 20 performs its clearing functions.

A tree-felling assembly 15, including tree-felling member 16, is attached to clearing means 10 and is adapted to coact with fragmenting means 9 (see FIG. 2), to fell standing trees. Preferably, tree-felling assembly 16 comprises a plurality of support arms, specifically depicted as 16a–16e in FIG. 2, joined at one end to clearing means 10 and, at the other end, to cross-member 16f. Cross-member 16f, on engaging a standing tree, imparts a substantial, positive force to the tree when a forward thrust is exerted on the cross-member by transporting apparatus 1, thereby facilitating the tree-felling operation.

A fragment deflector assembly 17, for deflecting a substantial portion of the particulate masses 50 which are conveyed toward clearing means 10, can also be provided, alone or in combination with tree-felling member 16. Preferably, however, the tree-felling member 16 and fragment deflector assembly 17 are jointly employed. The fragment deflector assembly 17, as pictured in FIG. 2, comprises, at its outer ends, arms 17a which are pivotally attached at one end at points 21a and 21b, to housing 11 and, at the other end, to cross-member support 17b. A deflector plate 17c is connected to arms 17a and cross-member support 17b and provides a surface against which a substantial portion of particulate masses 50 are deflected. Bracing members 17d are joined at one end to housing 11 and, at the other end, to cross-member support 17b, and act to reinforce deflector plate 17c.

A plurality of cables 19 are attached at one end to cross-member 16f and, at the other end, to cross-member support 17b, for limiting the downward, arcuate path of fragment deflector 17. To assure complete closure of the area surrounding fragmenting means 9, for

FORESTRY SITE PREPARATION SYSTEM

CROSS REFERENCE TO RELATED APPLICATION

This is a continuation-in-part of U.S. patent application Ser. No. 853,054, filed Nov. 21, 1977, now abandoned.

BACKGROUND OF THE INVENTION

This invention relates to an improved system for forestry site preparation.

The prior art has devised various systems for forestry site preparation. U.S. Pat. No. Re. 15,655 to McKoy et al.; U.S. Pat. No. 1,321,044 to Hurd; and U.S. Pat. No. 3,818,957 to Schoonover, all describe systems including radially rotating cutting discs which are employed to cut tree stumps, and in the latter patent to Schoonover, brush and trees are comminuted, as well. In each case, the disc-like cutters are supported on booms or other forwardly extending structures so that the material produced by cutting the woody growth is strewn on the ground in the general area where the cutting takes place. There are no means provided in any of these structures to ensure that a substantial amount of the particulate masses produced are reduced in size for direct tilling into the soil. Without the direct tilling option, piling or burning of the woody material would occur, causing problems with many federal and state environmental laws. The prior art does not provide apparatus for collecting the cut, woody material as an alternative to piling or burning.

The Schoonover patent applies to tree cutting as well as to the cutting of brush and tree stumps. In order to protect the land-clearing apparatus described by Schoonover, a guard frame 168 is provided to ensure that felled trees will not damage the apparatus. After the tree has been felled, a rotary cutter is employed to pulverize the tree on the ground, again at a point exterior to the apparatus itself. However, neither Schoonover nor any of the above patents provides a device which directly fells standing trees.

Other prior art machines for cutting tree stumps employ a horizontal cutting cylinder having cutting means on the curved periphery thereof. These various machines are described in U.S. Pat. No. 1,312,450 to McKoy et al.; U.S. Pat. No. 3,044,509 to Kehler; U.S. Pat. No. 3,389,726 to Good; U.S. Pat. No. 3,625,267 to Welborn; U.S. Pat. No. 3,732,905 to Pickel; and U.S. Pat. No. 3,868,980 and U.S. Pat. No. 3,931,841 both to Blüm. The above devices cut a given tree stump, leaving the woody material produced dispersed in the general area of cutting. The same problems associated with the previously described machines having rotating disc cutters apply to the tree-stump cutting machines of the cylindrical drum-type.

SUMMARY OF THE INVENTION

The present invention relates to a forestry site preparation system adapted for use with an apparatus capable of transporting the system through woody terrain. The system clears woody material, such as tree stumps, slash and the like, with a minimum disruption of land and topsoil. The clearing operation is performed in a manner such that minimum further preparation steps are required to facilitate planting. More specifically, the subject system fragments the woody material to particulate masses fine enough to allow direct discing and tilling into the soil without piling and burning. Alternatively, the wood particles produced can be recovered by collection thereof. In view of the pecuniary savings which can be afforded from the recovery of wood particles, this latter described system can be quite important.

The system itself provides a means attached to the transporting apparatus for clearing woody material, such as described above. The clearing means includes means for fragmenting the woody material into particulate masses. At least one auxiliary means for further fragmenting the woody material into particulate masses of a predetermined maximum size is connected to the clearing means. The presence of the auxiliary fragmenting means assures the user that a substantial amount of the particulate matter produced will be of a sufficient fineness for use in all of the above applications.

Some of the auxiliary fragmenting means contemplated herein includes at least one stationary anvil means or at least one horizontally disposed drum cylinder having a plurality of spaced cutting means fixed to the drum periphery, or any combinations of the above, as well as other like structures capable of performing a fragmenting function employed alone or in combination one with the other.

The auxiliary fragmenting means may preferably be employed in conjunction with fragmenting means having coacting teeth and/or breaker bars which compress and fragment therebetween woody material and particulate masses.

The clearing means may also include a means for collecting a substantial portion of the fragmented particles. Typically, when the system includes a collecting means, it also has means associated with the collecting means for harvesting the particulate masses conveyed to the collecting means. However, the collected particles may also be reconveyed to the land.

The apparatus preferably employs, as the fragmenting means, a horizontally disposed cylindrical drum having a plurality of spaced teeth affixed to the drum periphery. Furthermore, when an auxiliary fragmenting means is employed in coacting relationship with the fractionating means, a substantial quantity of particulate matter having a predetermined size can be produced. This is due to the fact that a narrowed passageway is established between the respective fractionating means and the auxiliary fractionating means, which limits the size of the woody particles which can pass therebetween.

Although the prior art Schoonover patent describes a guard frame for protecting the machine from a falling tree, the subject apparatus provides a tree-felling assembly attached to the clearing means, which coacts with the fragmenting means to fell standing trees. The tree-felling assembly includes a rigid cross-member which exerts a substantial positive force on a standing tree, while the tree is being fragmented, causing the tree to be felled in a downward, arcuate path in a direction away from the system.

Furthermore, the tree-felling assembly can be combined with a deflector means, pivotally attached to the clearing system, which is in an extended position during the fragmenting step for deflecting the particulate masses produced by fragmenting the woody material. Deflection of the particulate masses occurs toward this clearing system. The deflector means is moved to a retracted position when the assembly contacts a standing tree and during the felling operation.

maintaining the maximum amount of particulate masses 50 within the confines of clearing means 10, auxiliary flap 22, pivotally attached to housing 11 about point 23 (not shown), is provided.

In the embodiment of this invention, pictured in FIG. 7, an inner particle shield 18 is provided within the confines of housing 11 of clearing means 10 to facilitate mixing of the fragmented particles 50, as well as the dirt associated with the fragmenting operation, the particles 50 and dirt falling to the ground, as the machine moves along through the cleared site, being a mulched mixture.

Figure 4:
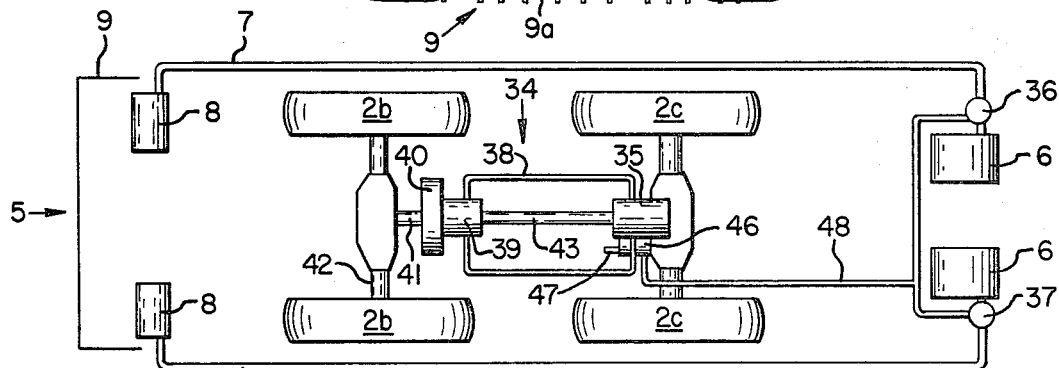
FIG. 4 is an illustrative view of the preferred hydraulic vehicle propulsion system employed in the forestry site preparation system of the present invention.

To maximize the use of horsepower of the fragmenting means 10, and to obtain the greatest productivity, it is preferred that a hydraulic vehicle propulsion system 5 be employed, as shown in FIG. 4. Thus, the maximum horsepower delivered to fragmenting means 9 can be provided through the use of two hydrostatic pumps 6 driven by diesel engine 3 transmitting high pressure oil through high pressure oil lines 7 to hydrostatic motors 8 mounted on clearing means 10. The system is further enhanced through the addition of two high-response compensator systems 36 and 37, respectively, with the right-hand unit 36 being the master unit, and the left-hand unit 37 being the slave unit. These compensators reduce the response time on the pumps 6 from three seconds to one-tenth second and assures that both pumps 6 will operate in unison with the master-and-slave system. The forward speed of transporting means 1 is maintained so that the fragmenting means' speed is controled above a minimum level for optimum performance, the speed being maintained above 60% of its rated value. The propulsion system 34 comprises a variable speed hydrostatic pump 35, which transmits high-pressure oil through lines 38 to hydrostatic motors 39. Power is transmitted via a four-speed transmission 40, which drives forward axle 42 through drive shaft 41, and rear axle 44 through drive shaft 43. The speed of transporting means 1 is set by the operator by varying the speed of the hydrostatic pump 35.

Since the speed of fragmenting means 9 is directly related to the degree of loading thereon exerted by the woody material, maintaining the proper forward speed is critical in maintaining the speed of fragmenting means 9, at least above the minimum level. Much of the woody material encountered by the operator is unseen by him and his reaction to slowing or stopping transporting means 1 is based on his ability to control the rpm of fragmenting means 9. Therefore, an integrated speed control for simultaneously controling the vehicle and fragmenting means' speed is preferably incorporated which requires minimal operator control. More specifically, the pressure-override system is installed on pump 35 but without the conventional pressure line thereto. Instead, a pressure-sensing line 48 is connected from systems 36 and 37 to the pressure port 49 (not shown) on the pressure override adjustable loading means 47. Thus, when the pressure in high pressure oil lines 7 exceeds the setting at loading means 47, due to an overload on fragmenting means 9 and a corresponding speed reduction, transporting means 1 slows or stops until the speed of the fragmenting means 9 has been readjusted. Full forward motion will resume when the pressure in line 7 falls below the setting at 47.

In a preferred embodiment of this invention, the subject site preparation system 20 includes, in place of shield 18, a means for collecting particulate masses 50, hereinafter denoted as "60". In the system depicted in FIG. 5, the collection means includes a passageway 61 leading to a particle-collecting plenum 62, both located within the confines of housing 11. A means 63 is associated with collecting means 60 for transferring the particles 50 to a remote storage area. Generally, a cross-transfer conveyor (not shown) is employed for this purpose. The particles are conveyed, after collection, from plenum 62 to remote storage source for subsequent use as fuel, ground covering or for any other suitable purpose.

In use, the tree-felling assembly 15 provides a means for exerting a substantial, positive force on a standing tree to promote a more effective and expeditious felling of the tree. More specifically, clearing means 10 is moved forward and eventually encounters a tree. The fragment deflector 17, which, in FIG. 13, is generally disposed in an extended position away from housing 11, on contacting the tree (see FIG. 14) is moved so that it pivots about points 21a and 21b until it engages cross-member support 17b and assumes a retracted position adjacent to tree-felling member 16. Fragmenting means 9 contacts the lower portion of the tree and the production of particulate masses 50 begins. Auxiliary flap 22 is also moved to a retracted position when the tree-felling assembly 15 contacts the tree. The tree is also engaged by tree-felling member 16, which is adapted to coact with fragmenting means 9 so that the above described positive force is imparted to the tree, while the tree is being fragmented, causing the tree to be felled in a downward, arcuate path away from the site preparation system 20. Means 9 continues to fragment the tree as transporting means 1 moves forward. Tree-felling member 16 continues to exert positive forces on the tree until it is cut and falls to the ground. The operator can selectively direct the felling of the tree using tree-felling member 16. As the tree is felled, fragment deflector 17 follows the fall of the tree to the limit of support cables 19. Fragmenting means 9 is then employed to raise the felled tree, lifting the tree and moving it, butt end first, toward housing 11, where it is fragmented into particles 50.

Fragmenting means 9, as shown in FIG. 6, is mounted on a main shaft 24, attached to housing 11, having two main bearings 25 provided for effective rotational movement over a wide range of predetermined speeds. Rotation of fragmenting means 9 is provided by hydrostatic motors 8 in conjunction with a band belt and sheave system 26. The belts and sheaves 26 are protected from the flying particulate masses 50 by end covers 27. Further protective devices, such as cables and mud guards, may also be included.

Horizontally disposed cylindrical drum 9a, the preferred fragmenting means, is depicted in FIG. 7, and includes a plurality of spaced teeth 9b maintained in position on the periphery of the drum by tooth holders 29. In a preferred configuration, seventy-eight teeth 9b are provided on the peripheral surface 9c, including a total of twenty-six cutter stations, each containing three teeth at 120-degree intervals. The preferred arrangement of the teeth, as well as breaker bars 28 located thereon, is pictured in FIG. 8. Alternate sets of teeth are preferably indexed 30 degrees forward so that the holders are spaced at 60-degree intervals.

Advantageously, at least one auxiliary fragmenting means, generally "33", is connected to housing 11, preferably at the point of entry into housing 11 of the fragmented particulate masses 50 for further fragmenting the particulate masses 50 and woody material, thereby substantially controling said particulate size. More specifically, auxiliary fragmenting means 33, preferably including at least one anvil means 33a, serves as a means for further fragmenting said previously fragmented particulate masses 50. Preferably, auxiliary fragmenting means 33, such as anvil means 33a, is adapted to coact with fragmenting means 9 to compress and further fragment therebetween woody material and particulate masses. Anvil means 33a typically comprises a rigid, substantially nondeformable plate attached at one end to housing 11, and disposed at the other end within the path of particles 50 which are conveyed toward housing 11 by fragmenting means 9. For example, during the fragmenting operation shown in FIG. 7, the fragmented particles 50 entrained or conveyed by teeth 9b are conveyed toward auxiliary fragmenting means 33, which, in this embodiment, is anvil means 33a. Auxiliary fragmenting means 33 forms a narrow passageway 33b in conjunction with fragmenting means 9. Passageway 33b is spaced to permit particulate masses of a predetermined maximum size to pass therethrough.

Typically, a tooth arrangement is provided such that the first and second cuts 70a and 70b, respectively, made in tree stump 70 are ripping cuts. This means that these cuts are not adjacent one to the other, but, instead permits an intermittent portion of woody material 70d to remain (see FIG. 10). The last cut provided, which is clearing cut 70c, removes the final portion 70d, the total effect being that an overall cleared path is provided in the woody material being particularized. This ripping, clearing pattern, which is pictorially depicted in FIGS. 9–11, minimizes the power requirement for fragmentation and avoids trailing of the teeth in previous cuts.

Breaker bars 28, disposed at predetermined intervals on the peripheral surface 9b of drum 9a, are a particularly effective way for further promoting fragmentation of woody material during said fragmenting step. The breaker bars serve two purposes. They provide a dynamic balance to counteract the irregular weight distribution of tooth holders 29. However, their primary purpose is to fragment woody material passing between breaker bars 28 and auxiliary fragmenting means 33. Breaker bars 28 also prevent wrapping of the tree limbs and branches around fragmenting means 9. For instance, as provided in FIG. 12, a felled tree is drawn edge-wise into passageway 33b which, in this instance, is formed between anvil means 33a and breaker bar 28, and the breaker bar acts as an "axe" when the woody material is compressed between the respective anvil means and breaker bar. Thus, by strategically locating breaker bars 28, as shown in FIG. 8, an even more effective fragmenting of particulate masses 50 can be provided.

In another embodiment of this invention (see FIG. 5), at least one auxiliary fragmenting means 30 is provided, alone or in combination with auxiliary fragmenting means 33, which, preferably, includes at least one rotatable, cylindrical drum 31, preferably, horizontally disposed, having a plurality of spaced, fixed cutting means 31a, such as teeth and the like, attached to the drum periphery 31b.

In still another form of the invention previously described in FIG. 5, a forestry site preparation system is provided (see FIGS. 15–18), which includes respective auxiliary fragmenting means 90 and 99. As depicted in FIGS. 15 and 16, auxiliary fragmenting means 99 is preferably an anvil means 99a, similar in construction and design to previously described anvil means 33, and auxiliary fragmenting means 90 is a means 91 for rechipping the particulate masses produced by fragmenting means 9′ and, in this case, further fragmented by auxiliary fragmenting means 99. It is clear, however, that auxiliary fragmenting means 90 can be provided without auxiliary fragmenting means 99, and vice versa. Rechipping step of the woody particles is of particular importance since the rechipped product formed can be employed as hog fuel to run steam boilers and the like, replacing precious fossil fuel. This permits a saving of both energy and dollars.

Auxiliary fragmenting means 90 and 99 are disposed at a sufficient distance from fragmenting means 9′ that they do not coact one with the other during the initial fragmenting step in which woody particulate masses 50 are formed. Furthermore, none of the herein described auxiliary fragmenting means coact with fragmenting means 9′ during the initial fragmenting step.

In the apparatus pictured in FIG. 15, as in the case of auxiliary fragmenting means 33 (see FIG. 5), auxiliary fragmenting means 99 and fragmenting means 9′, respectively, are disposed, one with respect to the other, to form a passageway, denoted "98", which permits woody material 50 of only a definite predetermined size to pass into housing 120. Similarly, auxiliary fragmenting means 90 of FIGS. 15 and 16 comprises a rechipping means 91 and a stationary cutting means 95, respectively, disposed, one with respect to the other, to form a passageway "98a", which permits woody material of only a definite predetermined size to pass into collecting plenum 62. Material greater than the predetermined size is fragmented and further reduced by the coaction of rechipping means 91 and stationary cutting means 95, one with respect to the other.

Rechipping means 91 comprises at least one rechipping element 93, which is preferably a rotatable, cylindrical drum, having attached thereto a plurality of spaced, fixed chipping means 94, such as, for example, chipping teeth, chipping knives, and the like. The rotatable drum is preferably horizontally disposed. A stationary cutting means 95, which coacts with rechipping means 91, and which preferably comprises a base 96 and a stationary cutting element 97, respectively, is attached to housing 120. Auxiliary fragmenting means 99 is also attached to housing 120, and preferably includes anvil means 99a. Auxiliary fragmenting means 99 coacts with breaker bars 28a to promote fragmentation of the woody material 50 in a similar manner as described with respect to auxiliary fragmenting means 33.

In FIGS. 15 and 16, fragmenting means 90, preferably rechipping means 91, is adapted for variable speed, rotational movement, preferably about a shaft 92. If desired, the fragmenting means 9′ and auxiliary fragmenting means 90 can be independently driven at the same or at different peripheral speeds. Accordingly, the peripheral speed of the auxiliary fragmenting means 90 can be increased or decreased, independent of the speed of fragmenting means 9′, to facilitate the auxiliary fragmentation. However, the drive means employed to rotate fragmenting means 9′ can also be directly interconnected to fragmenting means 90 to utilize the inertia from fragmenting means 9′ to assist in turning auxiliary fragmenting means 90.

As clearly shown in FIGS. 6 and 8, breaker bars 28 are provided on the peripheral surface 9c of drum 9a at predetermined intervals. In order to further facilitate the fragmentation of woody material, and in an effort to more fully prevent the warpping of tree limbs and branches around fragmenting means 9', breaker bars 28a are provided, which, instead of being disposed at predetermined intervals, extend across substantially the entire peripheral surface 9c of fragmenting means 9'. The breaker bars 28a are preferably disposed so that they are substantially parallel one with respect to the other, and preferably are positioned so that they are parallel to the longitudinal axis of drum 9a (see FIG. 18). It is also preferred that the respective breaker bars 28a of fragmenting means 9' be equidistantly spaced one with respect to the other.

A further means for felling standing trees, substantially similar to tree-felling assembly 15, is provided by tree-felling assembly 100 (see FIGS. 15 and 16). More specifically, tree-felling assembly 100, including a tree-felling member 101, is attached to, and extends outwardly from the front of clearing means 10, and is adapted to coact with fragmenting means 9' in the felling of standing trees. Preferably, tree-felling assembly 100, from the structural standpoint, comprises a plurality of support arms 101a–101e, joined at one end to clearing means 10 and, at the other end, to cross-member 101f. Cross member 101f, which is preferably a rigid, solid member, on engaging a standing tree, imparts a substantial positive force to the tree when a forward thrust is exerted on the cross member by the transporting apparatus, thereby facilitating the tree-felling operation.

A fragment deflector assembly 102, for deflecting a substantial portion of the woody particulate masses 50, produced by fragmenting means 9', toward housing 120 can be provided along, or in combination with tree-felling member 101. Fragment deflector assembly 102 is substantially similar in construction and function to fragment deflector assembly 17. It is preferred that tree-felling member 101 and fragment deflector assembly 102 be jointly employed, in a similar manner to tree-felling assembly 15 and fragment deflector 17, as pictorially described in FIGS. 13 and 14. The fragment deflector assembly 102 specifically shown in FIG. 17, attached to housing 120 at point 110, comprises, at its outer ends, arms 102a pivotally attached at one end, at points 107a and 107b, to housing 120 and, at the other end, to cross-member support 102b. A deflector plate 102c is connected to arms 102a and cross-member support 102b and provides a surface against which a substantial portion of particulate masses 50 are deflected. Bracing members 102d which are joined at one end to housing 120 and, at the other end, to cross-member support 102b, act to reinforce deflector plate 102c. A plurality of cables 19 are attached at one end to cross-member support 102e and, at the other end, to cross-member support 102b, for limiting the forward, arcuate path of fragment deflector assembly 102.

A deflector bar 104, including a hinged bar 104a and a deflector shield 104b, is attached to the outer end of fragment deflector 102. Also connected to the outer end of fragment deflector 102 is an auxiliary deflector 103 which is pivotally attached thereto at point 111. Auxiliary deflector 103 is preferably maintained in a substantially vertical position and, in conjunction with fragment deflector assembly 102, substantially surrounds the fragmenting means 9', causing fragmented woody particles 50 to be maintained within the confines of housing 120.

To further assure complete closure of the area surrounding fragmenting means 9', so that the maximum amount of particulate masses 50 are maintained within the confines of housing means 120, closure member 105 is preferably provided which is pivotally attached at one end to fragment deflector assembly 102, about point 108. A support means 106, in combination with closure member 105, pivotally connects tree-felling member 101 and fragment deflector assembly 102. As depicted in FIGS. 15 and 16, support means 106 comprises a pair of first and second support members 106a and 106b, respectively, pivotally joined one to the other at point 108. First member 106a is connected at its other end, at point 107, to tree-felling member 101, while second support member 106b is connected at its other end to fragment deflector assembly 102, at point 109.

In use, fragmented particles 50 produced by fragmenting means 9' are deflected by fragment deflector assembly 102, and auxiliary deflector 103, toward housing 120, in an effective and efficient manner, since, in the extended position, fragment deflector assembly 102 substantially surrounds fragmenting means 9'. When, however, a standing tree is encountered, fragment deflector assembly 102 and auxiliary deflector 103 are moved to a retracted position, as shown in FIG. 16. This permits tree-felling member 101 to directly contact the standing tree, to exert a substantial positive force on the tree, thereby causing a more efficient and effective felling thereof. More specifically, as clearing means 10 moves forward and encounters a standing tree, the fragment deflector assembly 102, which in FIG. 15 is disposed in extended position away from housing 120, on contacting the tree, is moved in an inward direction toward housing 120 so that it pivots about point 110 and assumes a retracted position (see FIG. 16) adjacent to housing 120 and tree-felling member 101. Also, as fragment deflector assembly 102 is inwardly retracted, closure member 105 and support means 106, which are also in an extended position prior to contact with the standing tree, are also moved to a retracted position, as shown in FIG. 16, the respective support means 106 and closure member 105 pivoting about points 107–109, respectively. When fragment deflector 102 is moved to a retracted position, tree-felling member 101 can directly engage the standing tree to be felled. The previously described positive tree-felling force is then imparted to the tree, while it is being fragmented, causing the tree to be felled in a downward arcuate path away from the site preparation system. Tree-felling member 101 continues to exert a positive, substantial force on the tree until it is cut and falls to the ground. As before, the operator of the forestry site preparation system can selectively direct the felling of the tree, using tree-felling member 101. When the tree begins to fall, fragment deflector 102 and auxiliary deflector 103 revert to an extended position, as in FIG. 15, fragment deflector 102 being limited by cables 19 and auxiliary deflector 103 being limited by stop 112.

We claim:

1. A forestry site preparation system adapted for use with an apparatus capable of transporting said system through woody terrain, comprising means for clearing woody material, including trees, tree stumps, and slash, for said woody terrain, said clearing means including means for fragmenting said woody material into particulate masses and said system also comprising at least one auxiliary fragmenting means for further fragmenting said particulate masses, thereby substantially controling the size of said particulate masses, said clearing means further including means for conveying said particulate masses toward said auxiliary fragmenting means.

2. The system of claim 1, wherein said auxiliary fragmenting means is adapted to coact with said fragmenting means to compress and further fragment therebetween said woody material and said particulate masses.

3. The system of claim 1, wherein said fragmenting means includes breaker bars disposed on the periphery of said fragmenting means for further promoting fragmentation of said woody material and particulate masses.

4. The system of claim 3, wherein said breaker bars are disposed at predetermined intervals on the periphery of said fragmenting means.

5. The system of claim 3, wherein said breaker bars extend across substantially the entire peripheral surface of said fragmenting means.

6. The system of claim 5, wherein said breaker bars are disposed in a direction substantially parallel one with respect to the other.

7. The system of claim 6, wherein said breaker bars are positioned so that they are parallel with the longitudinal axis of said fragmenting means.

8. The system of claim 7, wherein said breaker bars are equidistantly spaced one with respect to the other.

9. The system of claim 1, wherein said auxiliary fragmenting means comprises at least one horizontally disposed cylindrical drum having a plurality of spaced, fixed, cutting means attached to the drum periphery.

10. The system of claim 1, wherein said auxiliary fragmenting means comprises a rechipping means.

11. The system of claim 1, wherein the peripheral speed of said auxiliary fragmenting means can be increased or decreased independent of the speed of said fragmenting means to facilitate the auxiliary fragmentation.

12. The system of claim 1, wherein said rechipping means comprises a rotatable, cylindrical drum having attached thereto a plurality of spaced, fixed chipping means and, coacting therewith, a stationary cutting means.

13. The system of claim 1, which further includes a means for deflecting a substantial portion of said particulate masses produced by said fragmenting means toward a housing within said clearing means.

14. The deflector means of claim 13, which comprises at its outer end arms pivotally attached at one end to said housing and, at the other end, to a cross-member support, said arms and cross-member support, respectively, being connected to a deflector plate which, in the extended position, provides a surface in which a substantial portion of said particulate masses can be deflected.

15. The system of claim 13, which further includes a tree-felling assembly, attached to said housing, including a plurality of support arms joined at one end of said clearing means and, at the other end, to a cross member so that when the fragment deflecting or assembly is moved to a retracted position, the cross member engaging a standing tree for imparting a substantial, positive force thereto, thereby facilitating the tree-felling operation.

16. The system of claim 13, wherein said fragment deflector assembly includes an auxiliary flap, provided to assure complete closure of the area surrounding the fragmenting means, for maintaining a maximum amount of particulate masses within the confines of said clearing means, said flap being pivotally attached to said clearing means and, on contacting said tree by said deflector assembly, said flap is moved to a retracted position adjacent to said fragment deflector assembly.

17. The system of claim 13, which further includes auxiliary deflector means connected to the outer end of said fragment deflector, which is pivotally attached thereto so that auxiliary deflector means is maintained in a substantially vertical position and, in conjunction with said fragment deflector assembly, substantially surrounds said fragmenting means, thereby enabling the fragmented woody particles to be maintained within the confines of said housing.

18. A forestry site preparation system adapted for use with an apparatus capable of transporting the system through woody terrain, comprising:
(a) means for clearing woody material, including trees, tree stumps, and slash, from said woody terrain, said clearing means including a frame-like housing having a horizontally disposed, cylindrical drum rotatably mounted thereto, said cylindrical drum having a plurality of spaced teeth affixed to the peripheral surface thereof for fragmenting said woody material into particulate masses; and
(b) at least one auxiliary fragmenting means connected to said housing for further fragmenting said particulate masses, the spaced teeth being adapted to convey said particulate masses toward said auxiliary fragmenting means.

19. The system of claim 18, which further includes breaker bars attached to the peripheral surface thereof for providing a further effective means to promote fragmentation of said woody material and particulate masses, said breaker bars on said drum being adapted to coact with said auxiliary fragmenting means to compress and further fragment said particulate masses.

20. The system of claim 18, in which said auxiliary fragmenting means comprises anvil means connected to said housing at the point of entry into said housing of the fragmented particulate masses.

21. The system of claim 20, wherein said anvil means comprises a rigid, substantially nondeformable plate attached at one end to said housing, and disposed at the other end within the path of the particles which are conveyed toward the housing by said fragmenting means.

22. The system of claim 20, in which second auxiliary fragmenting means is provided, in conjunction with said first auxiliary fragmenting means, said second auxiliary fragmenting means including a rotating, cylindrical drum having a plurality of spaced, fixed cutting means attached to the drum periphery.

* * * * *